United States Patent
Yazici (10) Patent No.: US 8,055,497 B2
(45) Date of Patent: Nov. 8, 2011

(54) METHOD AND SYSTEM TO PARSE ADDRESSES USING A PROCESSING SYSTEM

(75) Inventor: Baris Yazici, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 1040 days.

(21) Appl. No.: 11/934,709

(22) Filed: Nov. 2, 2007

(65) Prior Publication Data

US 2009/0119093 A1    May 7, 2009

(51) Int. Cl.
*G06F 17/27* (2006.01)

(52) U.S. Cl. .................. 704/9; 704/7; 704/8

(58) Field of Classification Search .............. 704/9
See application file for complete search history.

(56) References Cited

U.S. PATENT DOCUMENTS

| | | | |
|---|---|---|---|
| 6,081,774 A * | 6/2000 | de Hita et al. ............ 704/9 |
| 6,363,392 B1 | 3/2002 | Halstead et al. | |
| 6,393,389 B1 * | 5/2002 | Chanod et al. ........... 704/7 |
| 6,523,041 B1 | 2/2003 | Morgan et al. | |
| 6,575,376 B2 | 6/2003 | Yu | |
| 6,963,832 B2 | 11/2005 | Vanhilst | |
| 6,970,868 B2 | 11/2005 | Jakesch | |
| 7,020,804 B2 | 3/2006 | Burdick et al. | |
| 7,210,130 B2 | 4/2007 | Fairweather | |
| 2002/0042707 A1 | 4/2002 | Zhao et al. | |
| 2002/0111951 A1 | 8/2002 | Zeng | |
| 2005/0080632 A1 | 4/2005 | Endo et al. | |
| 2005/0131725 A1 | 6/2005 | Sleeper et al. | |
| 2006/0041573 A1 | 2/2006 | Miller et al. | |
| 2006/0136196 A1 * | 6/2006 | Brun et al. ............ 704/8 |
| 2007/0015119 A1 | 1/2007 | Atenasio | |

OTHER PUBLICATIONS

Viola, Paul, et al., "Learning to Extract Information from Semi-structured Text using a Discriminative Context Free Grammer," Draft Submitted to the Conference SIGIR 2005, 8 pages.

Christen, Peter, et al., "Automated Probabilistic Address Standardisation and Verification," Department of Computer Science, Australian National University, Canberra, Australia, Found at http://datamining.anu.edu.au/linkage.html, 15 pages.

* cited by examiner

*Primary Examiner* — Justin Rider
(74) *Attorney, Agent, or Firm* — Patterson & Sheridan, LLP (57) ABSTRACT

A method and system for parsing an address is disclosed. The method and system comprise separating the address into a plurality of tokens and providing one or more token meaning discovery passes based upon region specific configuration information to determine the meaning of each token in the address. In so doing, an address can be parsed by a processing system in an efficient and effective fashion. By disclosing the meaning of each token of the address in accordance with a region specific configuration information rule set a parsing process is provided which allows for easy modification as the requirements for the parsing change.

24 Claims, 10 Drawing Sheets

--- setTokenMeanings

Pass 1:

Hardcoded meaning elimination completed

Token: <6600>
Rule: (NCR000), Unconditional rule.

| |
|---|
| [0001] STREETNUM |
| [0002] STREETNAME |
| [0003] UNITNUM |
| [0004] POBOXNUM |
| [0005] RRHCNUM |
| [0006] RRHCBOXNUM |

Rule: (NCR010), Condition [isNumberSign] failed for <6600>
Rule: (NCR020), Condition [NOT hasNumbers] failed for <6600>
Rule: (NCR030), Condition [NOT isPossibleUnitNumber OR isSuffixWord] failed for <6600>
Rule: (NCR040), Condition [hasNumberSign] failed for <6600>

Hardcoded meaning elimination completed

ParseAddress

Addr1:[6600 Bermuda Road, Suite A]
Addr2:[]
Addr3:[]
Addr4:[]

makeOneLineAddress *Removing characters % . , -* [6600 BERMUDA ROAD SUITE A]

*FIG. 3* tokenizeAddress

| 6600 | BERMUDA | ROAD | SUITE | A |

*FIG. 4* setTokenMeanings

Pass 1:

Hardcoded meaning elimination completed

Token: <6600>
Rule: (NCR000), Unconditional rule.

| [0001] STREETNUM |
| [0002] STREETNAME |
| [0003] UNITNUM |
| [0004] POBOXNUM |
| [0005] RRHCNUM |
| [0006] RRHCBOXNUM |

Rule: (NCR010), Condition [isNumberSign] failed for <6600>
Rule: (NCR020), Condition [NOT hasNumbers] failed for <6600>
Rule: (NCR030), Condition [NOT isPossibleUnitNumber OR isSuffixWord] failed for <6600>
Rule: (NCR040), Condition [hasNumberSign] failed for <6600>

Hardcoded meaning elimination completed

*FIG. 5A*

Token: <BERMUDA>
Rule: (NCR000), Unconditional rule.

| [0007] STREETNUM |
| [0008] STREETNAME |
| [0009] UNITNUM |
| [0010] POBOXNUM |
| [0011] RRHCNUM |
| [0012] RRHCBOXNUM |

Rule: (NCR010), Condition [isNumberSign] failed for <BERMUDA>
Rule: (NCR020), Condition [NOT hasNumbers] is true for <BERMUDA>

| [0013] ~~STREETNUM~~ |
| [0014] ~~POBOXNUM~~ |
| [0015] ~~RRHCNUM~~ |
| [0016] ~~RRHCBOXNUM~~ |
| [0017] STREETNAME |
| [0018] UNITNUM |

Rule: (NCR030), Condition [NOT isPossibleUnitNumber OR isSuffixWord] is true for <BERMUDA>

| [0019] ~~UNITNUM~~ |
| [0020] STREETNAME |

Token meaning set: STREETNAME

Hardcoded meaning elimination completed

FIG. 5B

Token: <ROAD>
Rule: (NCR000), Unconditional rule.

| |
|---|
| [0021] STREETNUM |
| [0022] STREETNAME |
| [0023] SUFFIX |
| [0024] UNITNUM |
| [0025] POBOXNUM |
| [0026] RRHCNUM |
| [0027] RRHCBOXNUM |

Rule: (NCR010), Condition [isNumberSign] failed for <ROAD>
Rule: (NCR020), Condition [NOT hasNumbers] is true for <ROAD>

| |
|---|
| [0028] ~~STREETNUM~~ |
| [0029] ~~POBOXNUM~~ |
| [0030] ~~RRHCNUM~~ |
| [0031] ~~RRHCBOXNUM~~ |
| [0032] STREETNAME |
| [0033] SUFFIX |
| [0034] UNITNUM |

Rule: (NCR030), Condition [NOT isPossibleUnitNumber OR isSuffixWord] is true for <ROAD>

| |
|---|
| [0035] ~~UNITNUM~~ |
| [0036] STREETNAME |
| [0037] SUFFIX |

Rule: (NCR040), Condition [hasNumberSign] failed for <ROAD>

Hardcoded meaning elimination completed

FIG. 5C

Token: <SUITE>
Rule: (NCR000), Unconditional rule.

| |
|---|
| [0038] STREETNUM |
| [0039] STREETNAME |
| [0040] UNITNUM |
| [0041] UNITLABEL |
| [0042] POBOXNUM |
| [0043] RRHCNUM |
| [0044] RRHCBOXNUM |

Rule: (NCR010), Condition [isNumberSign] failed for <SUITE>
Rule: (NCR020), Condition [NOT hasNumbers] is true for <SUITE>

| |
|---|
| [0045] ~~STREETNUM~~ |
| [0046] ~~POBOXNUM~~ |
| [0047] ~~RRHCNUM~~ |
| [0048] ~~RRHCBOXNUM~~ |
| [0049] STREETNAME |
| [0050] UNITNUM |
| [0051] UNITLABEL |

Rule: (NCR030), Condition [NOT isPossibleUnitNumber OR isSuffixWord] is true for <SUITE>

| |
|---|
| [0052] ~~UNITNUM~~ |
| [0053] STREETNAME |
| [0054] UNITLABEL |

Rule: (NCR040), Condition [hasNumberSign] failed for <SUITE>

Hardcoded meaning elimination completed

FIG. 5D

Token: <A>
Rule: (NCR000), Unconditional rule.

| [0055] STREETNUM |
| [0056] STREETNAME |
| [0057] UNITNUM |
| [0058] POBOXNUM |
| [0059] RRHCNUM |
| [0060] RRHCBOXNUM |

Rule: (NCR010), Condition [isNumberSign] failed for <A>
Rule: (NCR020), Condition [NOT hasNumbers] is true for <A>

| [0061] ~~STREETNUM~~ |
| [0062] ~~POBOXNUM~~ |
| [0063] ~~RRHCNUM~~ |
| [0064] ~~RRHCBOXNUM~~ |
| [0065] STREETNAME |
| [0066] UNITNUM |

Rule: (NCR030), Condition [NOT isPossibleUnitNumber OR isSuffixWord] failed for <A>
Rule: (NCR040), Condition [hasNumberSign] failed for <A>

*FIG. 5E*

Pass 2:

Token: <6600>
Rule: (UNIQ), Condition
[onlyOnce(STREETNUM,SUFFIX,PREDIR,POSTDIR,UNITLABEL,POBOXTYPE,RRH CLABEL)]

is true for <6600>
Rule: (CR001), Condition [NOT canTokenBeA(NEXT,SUFFIX) AND isFirstToken AND hasNumbers] is true for <6600>
Token meaning set: STREETNUM

*FIG. 6A*

Token: <ROAD>
Rule: (UNIQ), Condition
[onlyOnce(STREETNUM,SUFFIX,PREDIR,POSTDIR,UNITLABEL,POBOXTYPE,RRH CLABEL)]

is true for <ROAD>
Rule: (CR001), Condition [NOT canTokenBeA(NEXT,SUFFIX) AND isFirstToken AND hasNumbers] failed for <ROAD>
Rule: (CR002), Condition [isFirstToken] failed for <ROAD>
Rule: (CR010), Condition [isLastToken] failed for <ROAD>
Rule: (CR021), Condition [meaningsCompete(SUFFIX,STREETNAME) AND meaningsCompete(NEXT,SUFFIX,STREETNAME) AND canTokenBeA(PREV,STREETNAME)] failed for <ROAD>
Rule: (CR031), Condition [meaningsCompete(SUFFIX,STREETNAME) AND NOT weHavePossibleTokenMeaning(NEXT,SUFFIX) AND weHavePossibleTokenMeaning(PREV,STREETNAME)] is true for <ROAD>
Token meaning set: SUFFIX

*FIG. 6B*

Token: <SUITE>
Rule: (UNIQ), Condition
[onlyOnce(STREETNUM,SUFFIX,PREDIR,POSTDIR,UNITLABEL,POBOXTYPE,RRH
CLABEL)]

is true for <SUITE>
Rule: (CR001), Condition [NOT canTokenBeA(NEXT,SUFFIX) AND isFirstToken AND hasNumbers] failed for <SUITE>
Rule: (CR002), Condition [isFirstToken] failed for <SUITE>
Rule: (CR010), Condition [isLastToken] failed for <SUITE>
Rule: (CR021), Condition [meaningsCompete(SUFFIX,STREETNAME) AND
meaningsCompete(NEXT,SUFFIX,STREETNAME) AND
canTokenBeA(PREV,STREETNAME)] failed for <SUITE>
Rule: (CR031), Condition [meaningsCompete(SUFFIX,STREETNAME) AND NOT
weHavePossibleTokenMeaning(NEXT,SUFFIX) AND
weHavePossibleTokenMeaning(PREV,STREETNAME)] failed for <SUITE>
Rule: (CR032), Condition [canTokenBeA(SUFFIX) AND isPrefixActingSuffixWord
AND NOT weHavePossibleTokenMeaning(PREV,STREETNAME) AND
canTokenBeA(NEXT,STREETNAME)] failed for <SUITE>
Rule: (CR033), Condition [NOT isTokenA(PREV,STREETNAME)] is true for <SUITE>

| [0067] STREETNAME |
| [0068] UNITLABEL |

Rule: (CR034), Condition [isTokenA(NEXT,SUFFIX)] failed for <SUITE>
Rule: (CR040), Condition [(isFirstSetTokenA(PREV,STREETNAME) OR
isFirstSetTokenA(PREV ,PREDIR)) AND isFirstSetTokenA(NEXT,STREETNAME)]
failed for <SUITE>
Rule: (CR041), Condition [isFirstSetTokenA(PREV,STREETNAME) AND
isFirstSetTokenA(NEXT,SUFFIX)] failed for <SUITE>
Rule: (CR042), Condition [weHave(PREV,SUFFIX) AND weHave(PREV,STREETNAME)]
is true for <SUITE>

| [0069] ~~STREETNAME~~ |
| [0070] UNITLABEL |

Token meaning set: UNITLABEL

FIG. 6C

Token: <A>
Rule: (UNIQ), Condition
[onlyOnce(STREETNUM,SUFFIX,PREDIR,POSTDIR,UNITLABEL,POBOXTYPE,RRH CLABEL)]

is true for <A>
Rule: (CR001), Condition [NOT canTokenBeA(NEXT,SUFFIX) AND isFirstToken AND hasNumbers] failed for <A>
Rule: (CR002), Condition [isFirstToken] failed for <A>
Rule: (CR010), Condition [isLastToken] is true for <A>

| [0071] STREETNAME |
| [0072] UNINUM |

Rule: (CR021), Condition [meaningsCompete(SUFFIX,STREETNAME) AND meaningsCompete(NEXT,SUFFIX,STREETNAME) AND canTokenBeA(PREV,STREETNAME)] failed for <A>
Rule: (CR031), Condition [meaningsCompete(SUFFIX,STREETNAME) AND NOT weHavePossibleTokenMeaning(NEXT,SUFFIX) AND weHavePossibleTokenMeaning(PREV,STREETNAME)] failed for <A>
Rule: (CR032), Condition [canTokenBeA(SUFFIX) AND isPrefixActingSuffixWord AND NOT weHavePossibleTokenMeaning(PREV,STREETNAME) AND canTokenBeA(NEXT,STREETNAME)] failed for <A>
Rule: (CR033), Condition [NOT isTokenA(PREV,STREETNAME)] is true for <A>

| [0073] STREETNAME |
| [0074] UNITNUM |

Rule: (CR034), Condition [isTokenA(NEXT,SUFFIX)] failed for <A>
Rule: (CR040), Condition [(isFirstSetTokenA(PREV,STREETNAME) OR isFirstSetTokenA(PREV,PREDIR)) AND isFirstSetTokenA(NEXT,STREETNAME)] failed for <A>
Rule: (CR041), Condition [isFirstSetTokenA(PREV,STREETNAME) AND isFirstSetTokenA(NEXT,SUFFIX)] failed for <A>
Rule: (CR042), Condition [weHave(PREV,SUFFIX) AND weHave(PREV,STREETNAME)] is true for <A>

| [0075] ~~STREETNAME~~ |
| [0076] UNITNUM |

Token meaning set: UNITNUM

Token summary after pass: 2

*FIG. 6D*

| 6600 STREETNUM | BERMUDA<br><br>STREETNAME | ROAD<br><br>SUFFIX | SUITE<br><br>UNITLABEL | A<br><br>UNITNUM |
|---|---|---|---|---|

Token meanings that were set after pass 2:

| [0077] SUCCESS! |
|---|

Parsing address: [6600 BERMUDA ROAD SUITE A] *finished.*

*FIG. 7*

METHOD AND SYSTEM TO PARSE ADDRESSES USING A PROCESSING SYSTEM

FIELD OF THE INVENTION

The present invention relates generally to a processing system, and more particularly a process for parsing addresses utilizing a processing system.

BACKGROUND OF THE INVENTION

There are applications within processing systems that identifies street addresses that are in human language text. An IBM product, IBM Identity Resolution is an example of a program which identifies individuals and their associated street addresses. Street addresses are human language texts that are not immediately understandable by a computer for further information processing. Street addresses may not be understandable because the addresses may be in different languages, e.g. English, Arabic, Turkish, etc. that are not understandable by the computer.

Furthermore, street addresses may have different sentence structures depending on the country/region they are coming from. For example, although the U.K. and the USA both use English addresses, their address structure is totally different.

A conventional algorithm utilized in many applications for parsing addresses is referred to as a pattern matching algorithm. In this type of algorithm, an address is compared to a finite number of possible patterns and the pattern that matches the address first is used as the correct address. Since the patterns are compared in a previously determined order, an address may match a pattern although it may better match a later pattern. In addition, addresses that were not entered correctly may match wrong patterns or not match at all.

Furthermore, the number of patterns that needs to be in a processing system to allow for accurate matching of the street addresses will grow exponentially when the existence of a new type of address is realized. Hundreds of patterns may be required to represent all possible addresses in a country like the United States. In addition, some addresses such as 1234 East West Street may be difficult to parse with a pattern matching algorithm. For example, an ambiguous US street address is 1234 East West Street. Finally, cities with long histories (for example in Europe) tend to have addresses that are not very well structured. The number of patterns for such cities may be huge.

Accordingly, conventional pattern matching algorithms have the disadvantage of being slow due to numerous lookups per address and the difficulty to implement such an algorithm for a new language/region. Accordingly, what is desired is a method and system for parsing street addresses that overcome the above-identified issues. The present invention addresses such a need.

SUMMARY OF THE INVENTION

A method and system for parsing an address is disclosed. The method and system comprise separating the address into a plurality of tokens and providing one or more token meaning discovery passes based upon region specific configuration information to determine the meaning of each token in the address. In so doing, an address can be parsed by a processing system in an efficient and effective fashion. By disclosing the meaning of each token of the address in accordance with a region specific configuration information rule set a parsing process is provided which allows for easy modification as the requirements for the parsing change.

DETAILED DESCRIPTION OF THE INVENTION

The present invention relates generally to a processing system, and more particularly a process for parsing addresses utilizing a processing system. The following description is presented to enable one of ordinary skill in the art to make and use the invention and is provided in the context of a patent application and its requirements. The present invention is not intended to be limited to the implementations shown but is to be accorded the widest scope consistent with the principles and features described herein.

A system that utilizes a parsing process in accordance with the present invention can take the form of an entirely hardware implementation, an entirely software implementation, or an implementation containing both hardware and software elements. In one implementation, this disclosure is implemented in software, which includes, but is not limited to, application software, firmware, resident software, microcode, etc.

Furthermore, this parsing process can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk—read/write (CD-R/W).

Figure 1:
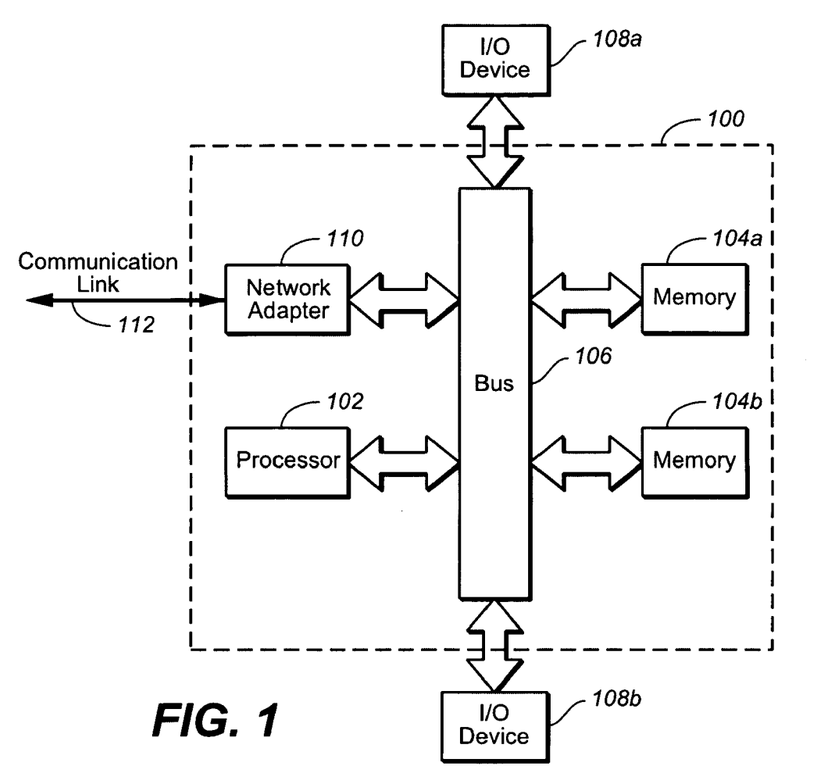
FIG. 1 is a diagram of a processing system in accordance with an embodiment.

FIG. 1 depicts a data processing system 100 suitable for storing and/or executing program code related to the parsing process. Data processing system 100 includes a processor 102 coupled to memory elements 104a-104b through a system bus 106. In other implementations, data processing system 100 may include more than one processor and each processor may be coupled directly or indirectly to one or more memory elements through a system bus.

Memory elements 104a-104b can include local memory employed during actual execution of the program code, bulk storage, and cache memories that provide temporary storage of at least some program code in order to reduce the number of times the code must be retrieved from bulk storage during execution. As shown, input/output or I/O devices 108a-108b are coupled to data processing system 100. I/O devices 108a-

108*b* may be coupled to data processing system 100 directly or indirectly through intervening I/O controllers (not shown).

In the implementation, a network adapter 110 is coupled to data processing system 100 to enable data processing system 100 to become coupled to other data processing systems or remote printers or storage devices through communications link 112. Communication link 112 can be a private or public network. Modems, cable modems, and Ethernet cards are just a few of the currently available types of network adapters.

In a parser process in accordance with an embodiment, the meanings of each token of an address is determined as soon as possible. This determination is accomplished by discovering the token meanings of each element of the address. This will be described hereinafter as token meaning discovery. Accordingly, by utilizing one or more passes of token meaning discovery based upon a region specific configuration information, one or more token meanings is eliminated until all tokens are determined or no more token meanings can be determined based upon the passes. Matching problems can then be eliminated by providing new rules or by modifying existing rules.

In addition, debugging a rule set of the region specific configuration information is very easy with a parser process in accordance with this embodiment. An output preferably in HTML could be utilized for indicating exactly how the rule is applied and what token meanings each rule eliminates in each pass.

Therefore, in an embodiment, a street address is first tokenized, that is, the elements of the address are separated into individual tokens. The goal of the parsing process in accordance with an embodiment is to reduce the number of meanings for a token to one, thereby discovering the only possible meaning for that token. Therefore a meaning for each token is discovered in accordance with a region specific configuration information until all token meanings are found or the token meanings cannot be reduced further.

Region specific configuration information rule sets allows for effective operation of the parsing process. Two examples of region specific configuration information are:

ADDRESS PARTS (ROAD, AVE, RUE, etc. words)
RULE SETS (the rules governing the actual parse)

By utilizing the configuration information with one or more passes of token discovery meanings, a parsing process is provided that is advantageous over conventional parsing algorithms.

In an embodiment, a first token meaning discovery pass requires no context information (no surrounding token information) to initially attempt to reduce the meanings associated with the tokens of the street address. For example, 124 in the street address, 124 Bermuda Road, is not a street suffix in the United States, so that the possibility of 124 being a suffix can be eliminated immediately.

Second and subsequent token meaning discovery passes require context information to attempt to further reduce the meanings for each token. Context information, in this instance, means the information about the surrounding tokens.

For example, the meaning of Bermuda in the 124 Bermuda Road may be set to STREET NAME by looking at previous and next tokens, because the region specific configuration information rules are configured to indicate that "A token is a STREET NAME if it is between a STREET NUMBER and STREET SUFFIX".

Figure 2:
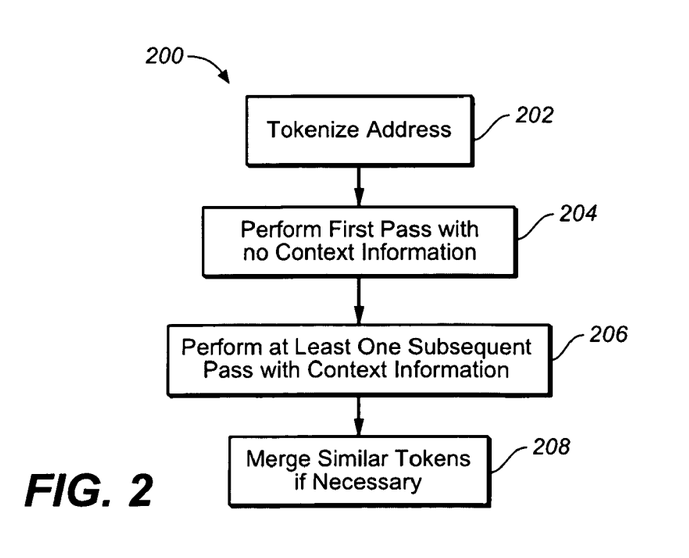
FIG. 2 is a flow chart of a parsing process in accordance with an embodiment.

To describe the features of an embodiment of a parsing process in accordance with an embodiment in more detail refer to the following description in conjunction with the accompanying Figures. FIG. 2 is a flow chart of an embodiment of a process for parsing an address. First, the street address is tokenized, via step 202. In one embodiment, the address is tokenized by dividing the address separate words or elements and then associating a token with each word or element. In addition, some special tokens may be arranged by merging or splitting words and/or elements. For example, the term #5 can be split to # and 5 or PO and Box can be merged into PO BOX.

Next a first pass for token meaning discovery is performed with no context information, via step 204. In this first pass, for all tokens at least one hardcoded rule from a region specific configuration information rule set in this process is applied. Token meanings can be eliminated via a lookup table in the memory of processing system. For example, if a token is not one of directional words (East, West, South, North) within a particular lookup table, this token meaning can be eliminated immediately for the token. The rules from the region specific configuration information rule set in this process are applied. Token meaning eliminations can be performed without needing contextual information (for example, # sign in US is always a unit label or if a token does not have numbers in it, the token cannot be a street number).

Passes for token meaning discovery are then applied that include context information to each of the tokens utilizing the region specific configuration information-rule set with context information, via step 206. These passes are performed until all tokens meanings are found or a last pass changed nothing in the terms of identifying a token. Accordingly, if a meaning is known for certain of a particular token, the contextual rules are applied. The contextual rules are utilized to eliminate token meanings such as adjacent tokens, position of token in the address, etc.

Finally, similar tokens are merged if necessary, via step 208. In this step if adjacent tokens have the same meaning, they are merged into one token. For example, in the address "Yellow Rose Street" Yellow and Rose are found to be two tokens whose meanings are street name then the tokens are merged as "Yellow Rose".

To describe this process in context of a specific example, refer now to the following. In this example, a street address is "6600 Bermuda Road, Suite A." is parsed. In this implementation the address is a U.S. address and a rule set is created and applied to the address that conforms to U.S. address rules. However, one of ordinary skill in the art readily recognizes, that any address from a particular county and a rule set that conforms to that country could be utilized and that use would be within the spirit and scope of the present invention. Furthermore it is understood that the rule set can be modified based upon new types of address being introduced in a country or a discovery that some addresses cannot be accurately discovered utilizing the original rule set and that would be within the spirit and scope of the present invention.

To describe the present invention in the context of a particular example refer now to the following. FIGS. 3-7 illustrate an example of the process of parsing a U.S. street address "6600 Bermuda Road, Suite A" utilizing an embodiment of the parsing process.

Below are acronyms that could be utilized as tokens for the U.S. street address and their associated meanings.

STREETNUM: Street number e.g. (6600) in "6600 Bermuda Road, Suite A"

PREDIR Directional word that precedes the street name. E.g. (West) in "West Sahara Ave."

POSTDIR Directional word that follows the street name/suffix: e.g., (West) in "Sunset Ave, West"

STREETNAME Street name E.g. (Bermuda) in "6600 Bermuda Road, Suite A"

PREFIX Street type that precedes the street name E.g. (Rue) in "Rue Morgue". Not for US addresses.

SUFFIX Street type that follows the street name E.g. (Road) in "6600 Bermuda Road, Suite A"

UNITSIDE (Currently Spain addresses only) Left or Right, etc. Not for US addresses BUILDINGSIDE (Currently Spain addresses only) Left or Right, etc. Not for US addresses UNITNUM Unit number E.g. (A) in "6600 Bermuda Road, Suite A"

UNITLABEL Unit label E.g. (Suite) in "Bermuda Road, Suite A"

POBOXNUM P.O. Box number E.g. (32) in "P.O. Box 32"

POBOXTYPE P.O. Box type E.g. (P.O. Box) in "P.O. Box 32"

RRHCLABEL Rural route label E.g. (RR) in "RR 32 Box 45"

RRHCNUM Rural route label E.g. (32) in "RR 32 Box 45"

Figure 3:
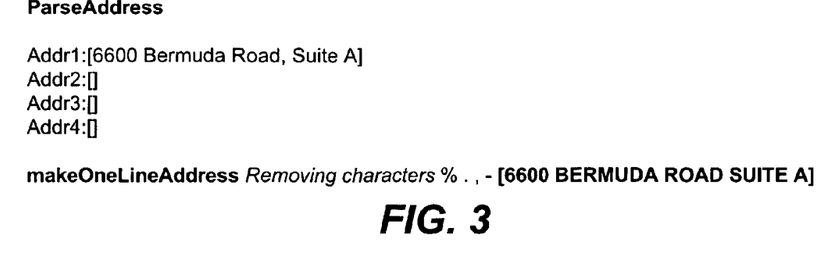
FIGS. 3-7 illustrate an example of the process of parsing the street address 6600 Bermuda Road, Suite A, in accordance with an embodiment.
Figure 4:
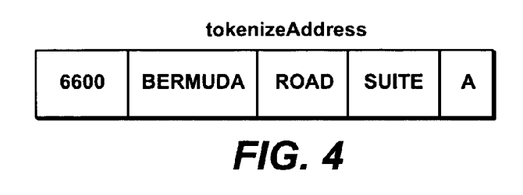

As is shown in FIG. 3, the street address is provided in a single line. FIG. 4 illustrates tokenizing the address by separating the elements of the address into separate tokens. In this embodiment, each element is a token. However as before described some elements could be split such as a number sign from a number or some elements could be merged during this tokenizing step such as PO and Box to more accurately separate the elements.

FIG. 5A-5E illustrates a first token meaning discovery pass in accordance with an embodiment. For each token, in the beginning of the first pass where there is no context information a hard coded meaning elimination step is performed. In this hard coded meaning elimination step, meanings of tokens are eliminated for example just by looking at the meaning in a lookup tables. For example, the token "Bermuda" in 6600 Bermuda Road, Suite A, can be eliminated as a suffix by referring to an ADDRESSPARTS:SUFFIX table. In addition, if a rule does not have a condition in its definition it is called an "Unconditional Rule". For these rules "eliminate" or "set" attributes are always applied. For example, RULE NCR000 shown in FIG. 5A eliminates "PREFIX, UNITSIDE, BUILDINGSIDE" because US Addresses do not have prefixes, unit sides or building sides. It is accepted that these types of descriptions are not used for addresses in US.

Figure 5A:
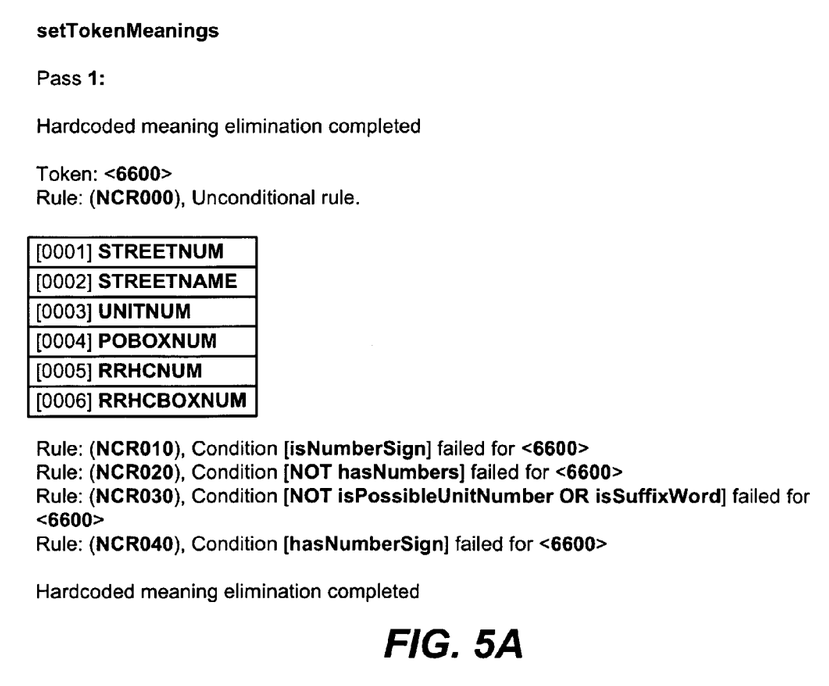
Figure 5B:
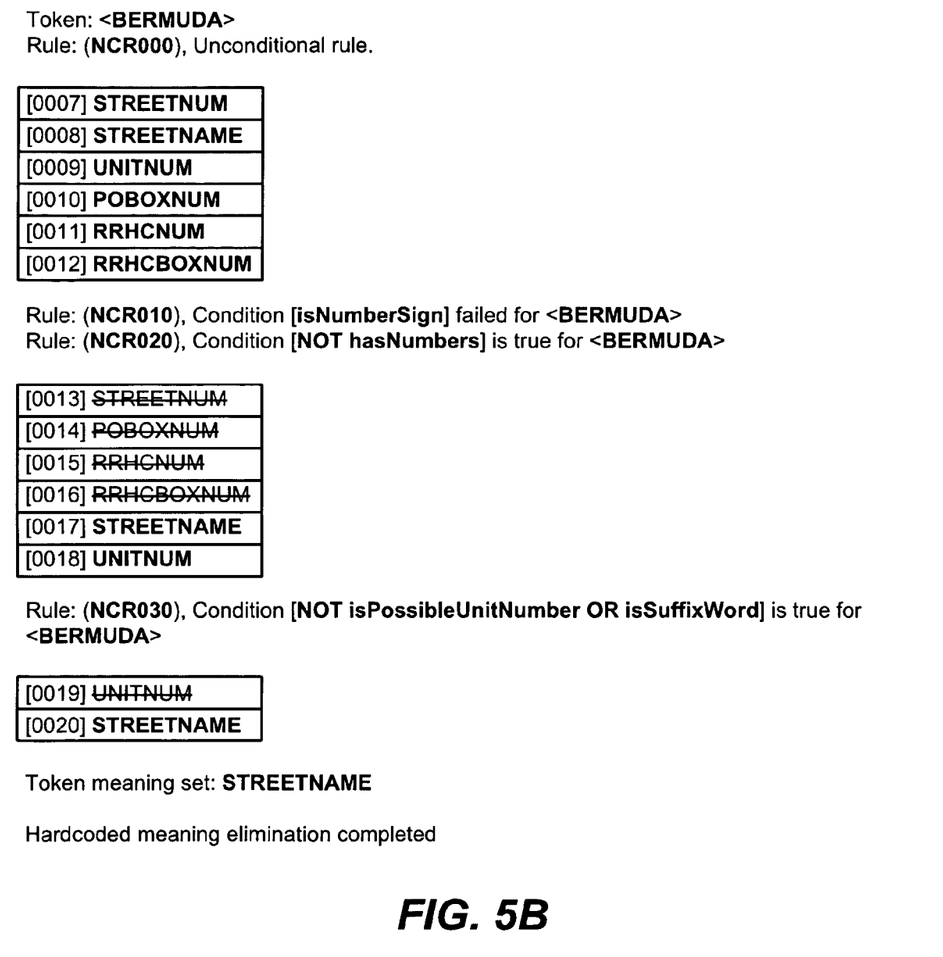
Figure 5C:
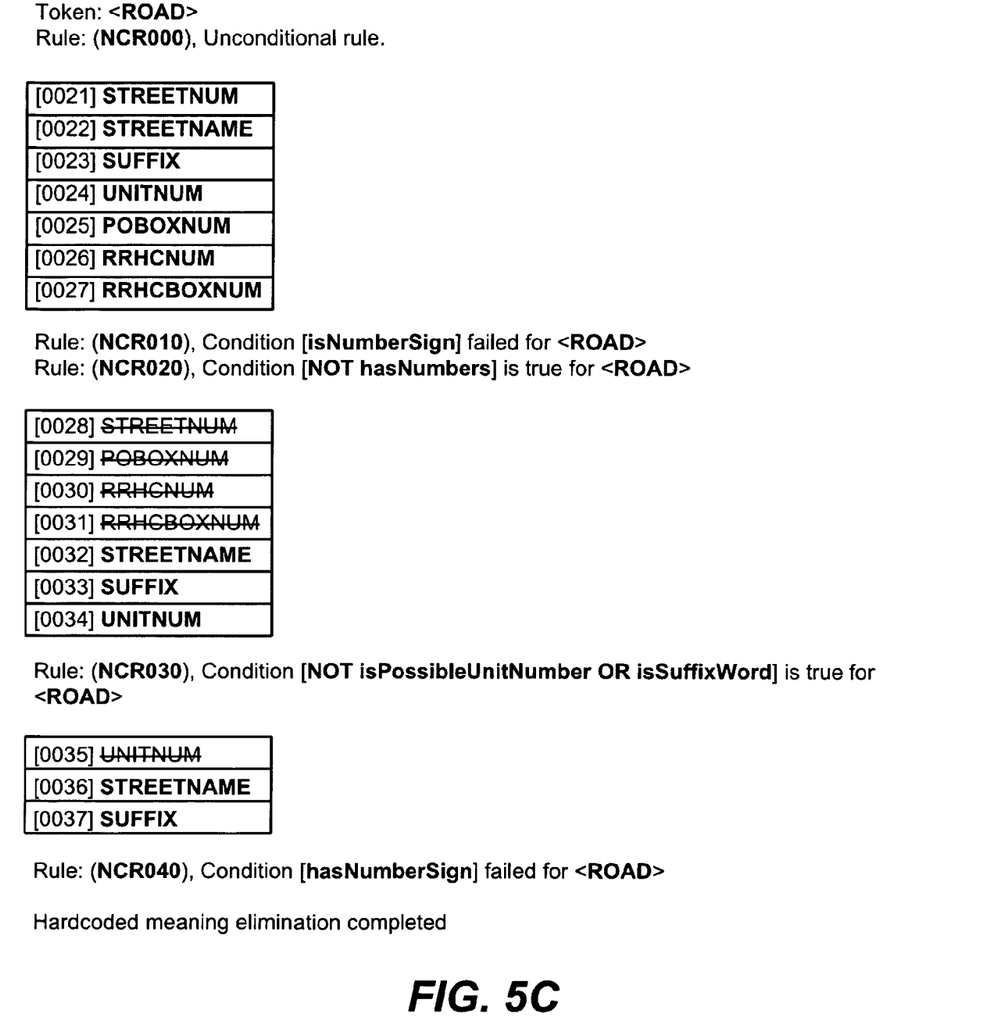
Figure 5D:
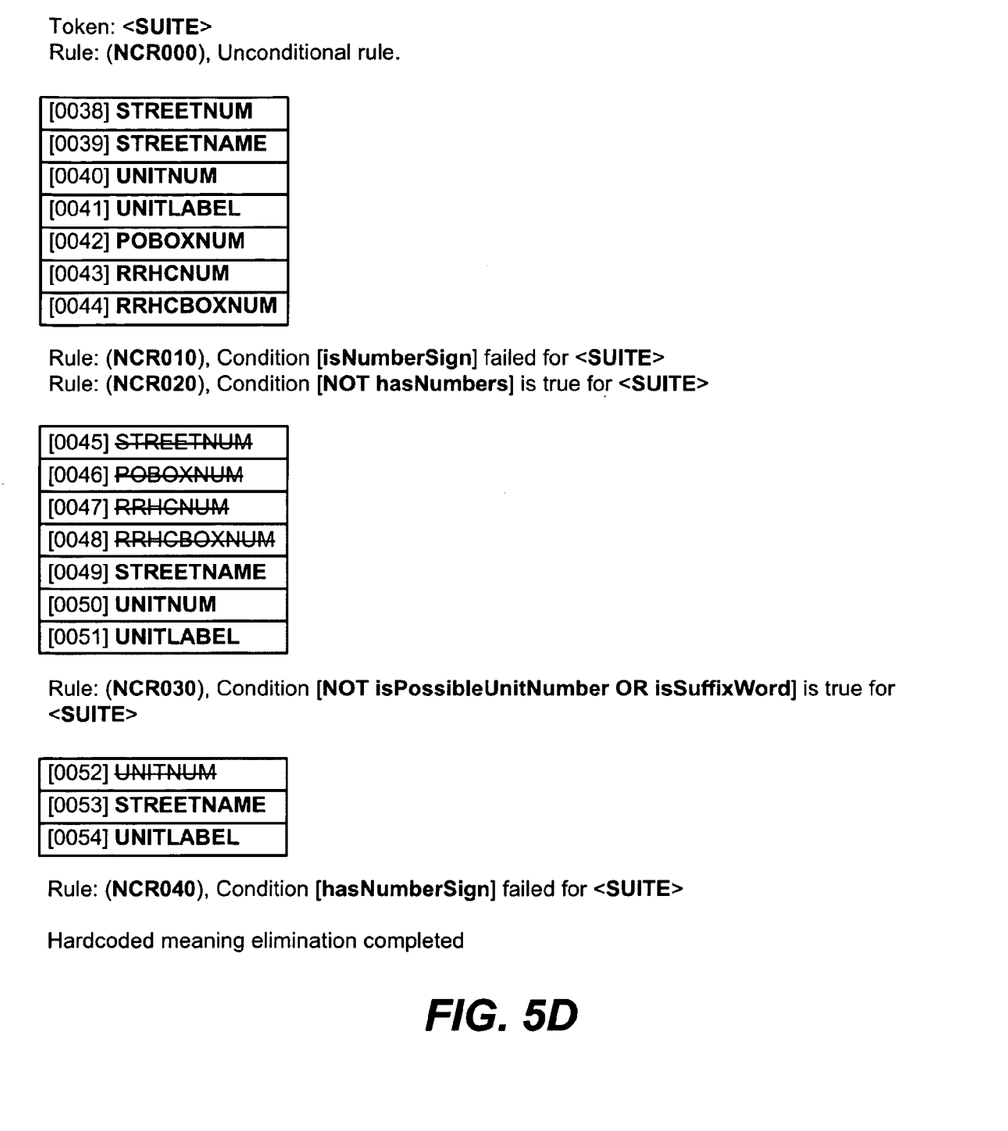
Figure 5E:
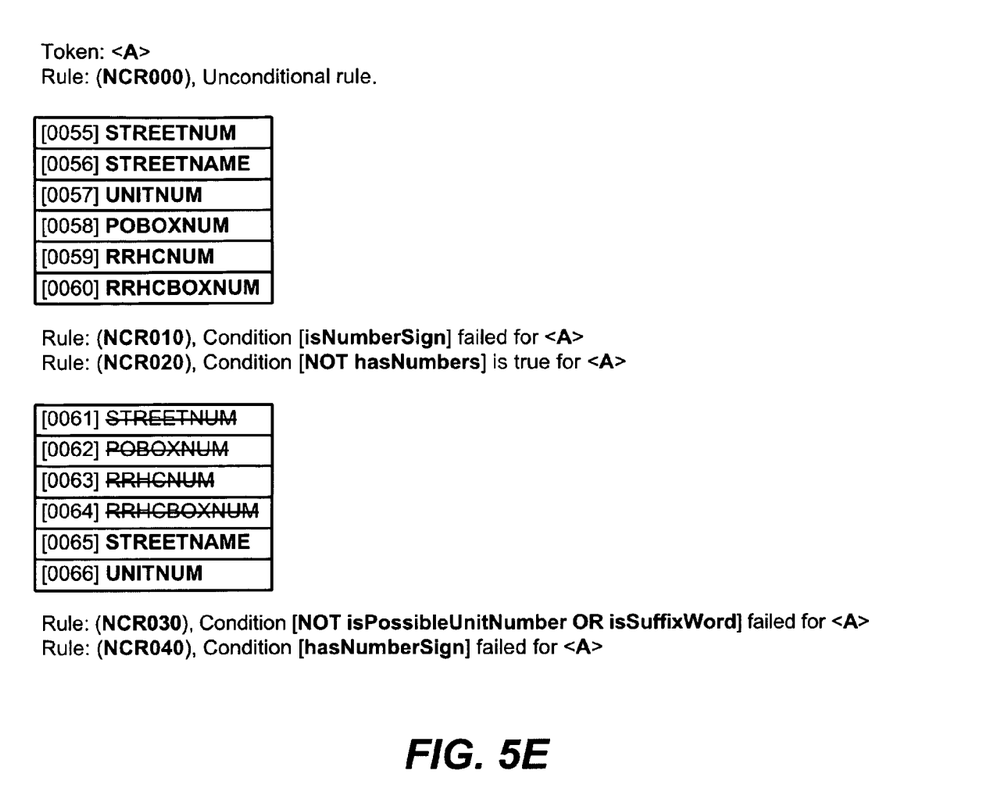

Also as before mentioned, in the first pass, each token is acted upon by the region specific configuration information without context information to determine if any of the elements can be given a token meaning. Referring to FIG. 5A for the element "6600" all tokens not number related are eliminated based upon the rule set. In FIG. 5B it is determined that "Bermuda" is a street name. For the element "Road" all tokens are eliminated except "Streetname" and "Suffix". For the element "Suite", referring to FIG. 5E, all tokens are eliminated except "Streetname" and "UnitName" for the element "A". Referring to FIG. 5F, for the element "A", all tokens are eliminated except "Streetname" and "UnitNum. Accordingly as is seen after the first pass a number of token meanings have been eliminated for each element of the address and in one instance "Bermuda" the token has been identified based upon the rule set with no context information.

Figure 6A:
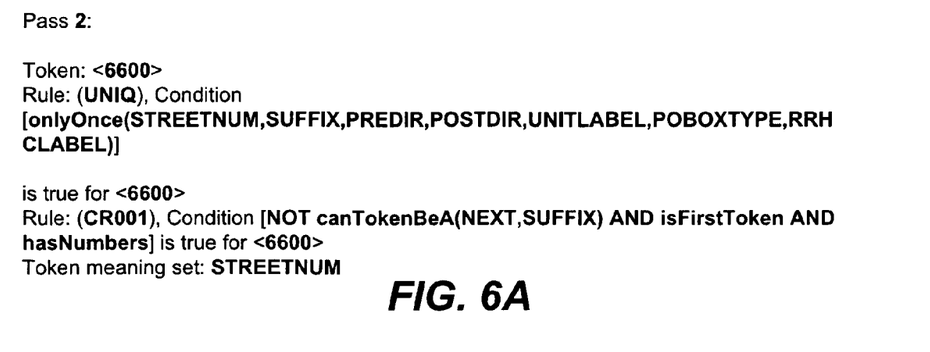
Figure 6B:
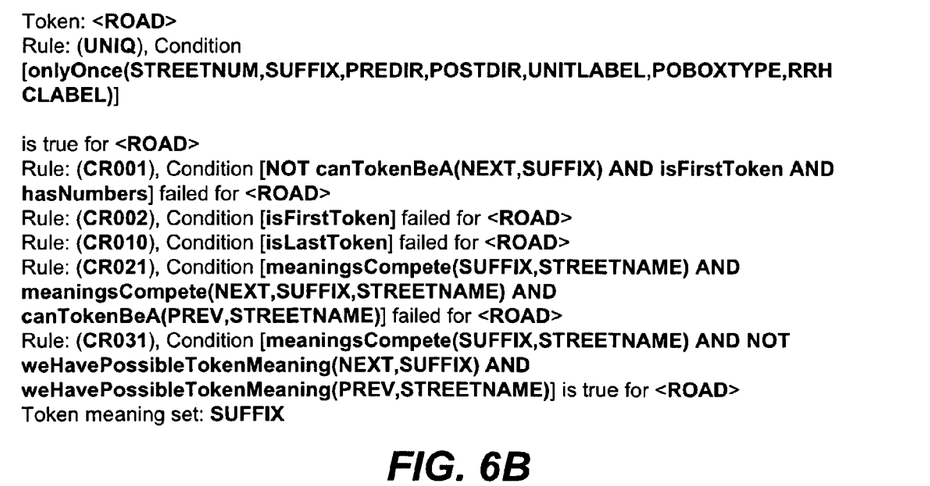

As before mentioned in subsequent passes context information is included to further discover the token meanings for each element. Referring back to the example, FIGS. 6A-6D illustrate token meaning discovery for the elements utilizing context information. In FIG. 6A, it is determined through the rule set that "6600" is a street number "StreetNum". In FIG. 6B, it is determined through the rule set that ROAD in a Suffix. In FIG. 6C it is determined through rule set that the token meaning for "Suite" is a UNITLABEL. Finally, in FIG. 6D, it is determined through the rule set that token meaning for "A" is UNITNUM.

Figure 7:
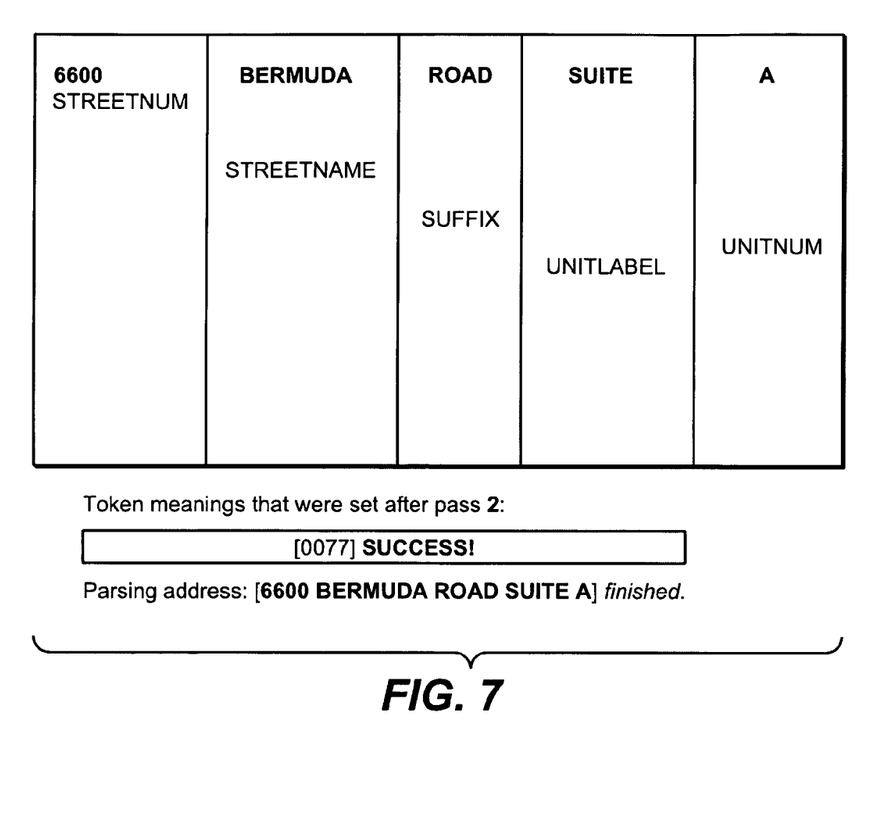

FIG. 7 illustrates the results of the two passes of the address. Accordingly, by utilizing two passes in this embodiment, the token meanings for each of the elements have been discovered and effectively parsed by the process. In so doing, a parsing process is provided that has significant advantages over conventional parsing processes.

Advantages

A parser in accordance with the present invention requires no code change to add another language/region specific configuration information address type. Only a new configuration is needed. The parsing process can operate totally in memory after its region specific configuration information is loaded. The output can include a log to allow for the debugging if it is determined that an address is not accurately parsed.

Although the present invention has been described in accordance with the embodiments shown, one of ordinary skill in the art will readily recognize that there could be variations to the embodiments and those variations would be within the spirit and scope of the present invention. For example, although a U.S. street address is parsed in the embodiment one of ordinary skill in the art recognizes that other types of addresses and addresses of different countries could be parsed and that would be within the spirit and scope of the present invention. Accordingly, many modifications may be made by one of ordinary skill in the art without departing from the spirit and scope of the appended claims.

What is claimed is:

1. A parsing method comprising:
    separating an address into a plurality of tokens;
    performing an initial pass on the plurality of tokens based on geographic region-specific configuration information for the address to determine at least one candidate classification for each of the tokens in the plurality of tokens, wherein the initial token meaning discovery pass is performed without context-specific information for the address; and
    performing, by operation of one or more computer processors, one or more additional passes on the plurality of tokens based on the geographic region-specific configuration information for the address to determine a final classification of each token in the address, wherein the final classification is selected from the determined candidate classifications for the token, and wherein the one or more additional passes are performed with context-specific information relating the token to one or more other tokens in the plurality of tokens.

2. The method of claim 1, wherein region specific configuration information includes address parts and rule sets.

3. The method of claim 1, wherein the address comprises a street address.

4. The method of claim 1, wherein the region specific configuration information comprises context specific rules and non-context specific rules.

5. The method of claim 4, wherein the non-context specific rules are used to determine the candidate classifications for each token during the initial pass, and wherein the context specific rules are used to determine the final classification of each token during the additional passes.

6. The method of claim 5, wherein at least one of the non-context specific rules specifies one or more data types for each candidate classifications, and wherein the candidate classifications for each token are determined based on a data type of the respective token.

7. The method of claim 1, wherein elements of the address are merged to provide a token.

8. The method of claim 1, wherein at least one Element of the address is separated to provide separate tokens.

9. A non-transitory computer-readable medium containing program instructions for parsing an address comprising:
  separating an address into a plurality of tokens;
  performing an initial pass on the plurality of tokens based on geographic region-specific configuration information for the address to determine at least one candidate classification for each of the tokens in the plurality of tokens, wherein the initial token meaning discovery pass is performed without context-specific information for the address; and
  performing one or more additional passes on the plurality of tokens based on the geographic region-specific configuration information for the address to determine a final classification of each token in the address, wherein the final classification is selected from the determined candidate classifications for the token, and wherein the one or more additional passes are performed with context-specific information relating the token to one or more other tokens in the plurality of tokens.

10. The computer-readable medium of claim 9, wherein region specific configuration information includes address parts and rule sets.

11. The computer-readable medium of claim 9, wherein the address comprises a street address.

12. The computer-readable medium of claim 9, wherein the region specific configuration information comprises context specific rules and non-context specific rules.

13. The computer-readable medium of claim 12, wherein the non-context specific rules are used to determine the candidate classifications for each token during the initial pass, and wherein the context specific rules are used to determine the final classification of each token during the additional passes.

14. The computer-readable medium of claim 13, wherein at least one of the non-context specific rules specifies one or more data types for each candidate classifications, and wherein the candidate classifications for each token are determined based on a data type of the respective token.

15. The computer-readable medium of claim 9, wherein elements of the address are merged to provide a token.

16. The computer-readable medium of claim 9, wherein at least one element of the address is separated to provide separate tokens.

17. A processing system comprising:
  a processor;
  a memory coupled to the processor and containing a program that, when executed by the processor, performs an operation for parsing an address, comprising:
    separating an address into a plurality of tokens;
    performing an initial pass on the plurality of tokens based on geographic region-specific configuration information for the address to determine at least one candidate classification for each of the tokens in the plurality of tokens, wherein the initial token meaning discovery pass is performed without context-specific information for the address; and
    performing one or more additional passes on the plurality of tokens based on the geographic region-specific configuration information for the address to determine a final classification of each token in the address, wherein the final classification is selected from the determined candidate classifications for the token, and wherein the one or more additional passes are performed with context-specific information relating the token to one or more other tokens in the plurality of tokens.

18. The processing system of claim 17, wherein region specific configuration information includes address parts and rule sets.

19. The processing system of claim 17, wherein the address comprises a street address.

20. The processing system of claim 17, wherein the region specific configuration information comprises context specific rules and non-context specific rules.

21. The processing system of claim 17, wherein elements of the address are merged to provide a token.

22. The processing system of claim 17, wherein at least one element of the address is separated to provide separate tokens.

23. The processing system of claim 20, wherein the non-context specific rules are used to determine the candidate classifications for each token during the initial pass, and wherein the context specific rules are used to determine the final classification of each token during the additional passes.

24. The processing system of claim 23, wherein at least one of the non-context specific rules specifies one or more data types for each candidate classifications, and wherein the candidate classifications for each token are determined based on a data type of the respective token.

\* \* \* \* \*